US007018154B2

(12) United States Patent
Schmon

(10) Patent No.: US 7,018,154 B2
(45) Date of Patent: Mar. 28, 2006

(54) PAINT SPRAY GUN

(75) Inventor: Ewald Schmon, Grafenburg (DE)

(73) Assignee: Sata-Farbspritztechnik GmbH & Co., (DE)

( * ) Notice: Subject to any disclaimer, the term of this patent is extended or adjusted under 35 U.S.C. 154(b) by 492 days.

(21) Appl. No.: 09/727,465

(22) Filed: Dec. 4, 2000

(65) Prior Publication Data

US 2001/0004996 A1 Jun. 28, 2001

(30) Foreign Application Priority Data

Dec. 4, 1999 (DE) ................................ 199 58 569

(51) Int. Cl.
*F16B 35/04* (2006.01)

(52) U.S. Cl. ....................... 411/414; 411/424; 411/436; 411/336.3; 239/600

(58) Field of Classification Search ................ 411/411, 411/414, 424, 436, 366.3, 366.1; 239/600
See application file for complete search history.

(56) References Cited

U.S. PATENT DOCUMENTS 4,906,151 A * 3/1990 Kubis .......................... 108/88
6,250,567 B1 * 6/2001 Lewis et al. ................ 239/292

* cited by examiner

*Primary Examiner*—Christopher Kim
(74) *Attorney, Agent, or Firm*—Hall, Vande Sande & Pequignot

(57) ABSTRACT

This invention is directed towards a paint spray gun having a gun body with a male thread and having an air nozzle ring with a female thread which can be screwed onto the male thread of the gun body. The diameter of the thread is between about 30 and about 40 mm. The thread of the invention is a trapezoid thread with a flank angle in the range of about +/−20% of 30°. The thread has a thread height within the range of about +/−20% of 1.1 mm, a root to crest clearance within the range of about +/−20% of 0.1 mm and a flank clearance within the range of about +/−20% of 0.15 mm. The effect of these modifications to a standard trapezoid thread with a flank angle of about 30° is that the thread is optimally adjusted to serve as a thread connecting the body of a paint spray gun and a nozzle ring.

11 Claims, 2 Drawing Sheets

PAINT SPRAY GUN

FIELD OF THE INVENTION

This invention concerns a new type of thread. This new type of thread can be used to connect the body of a spray paint gun with its air nozzle ring.

BACKGROUND OF THE INVENTION

In certain known paint spray guns the thread that connects the body of the gun and the air nozzle ring is a DIN 13 fine thread. The nominal diameter of the thread is between M 30 and M 38. Pitches of 1.0 mm, 1.5 mm and 1.75 are common. With this type of thread a precise centering of the air nozzle relative to the paint nozzle is possible, which is a precondition of good spray results.

However, the use of fine thread has disadvantages. The best known disadvantage is that when the thread gets dirty, its cleaning is time consuming. A further disadvantage is that at least five revolutions are necessary to screw the air nozzle ring onto the gun body or to unscrew it. Furthermore, cross-threading often occurs when the air nozzle ring is screwed onto the outer thread of the body of the gun, resulting in damage to the thread.

To overcome these disadvantages the present inventor has considered replacing the fine thread with a trapezoid thread. A metric ISO-trapezoid thread is described in DIN 103. However, the inventor has found that a standard trapezoid thread would also have disadvantages. A standard trapezoid thread would require reinforcement of the wall of both the gun body and the air nozzle ring in the area of the trapezoid thread. This would increase the weight of the gun body by approximately 10%, and thus increase the weight of spray guns, increasing the strain on the user. Another potential disadvantage could result from the large flank clearance of a standard trapezoid thread which may cause cross-threading of the air nozzle ring and cause the ring to lean to one side. As a result of this, the centers of the air nozzle and the paint nozzle would not be in alignment, negatively affecting the paint stream. Investigation by the inventor also showed that the substantially larger pitch of the usual trapezoid thread did not make it easier to clean the thread as compared to the fine thread. Thus, it is proposed to modify the standard trapezoid thread to improve its usefulness as a connector of a gun body and a nozzle ring.

SUMMARY OF THE INVENTION

The spray paint gun of the present invention comprises a gun body having a male thread and an air nozzle ring having female thread, the female thread being adapted to be screwed onto the male thread. The male and female threads are trapezoidal threads having flank angles in the range of 30 degrees+/−20%. The male and female threads have thread diameters between about 30 and about 40 mm, and are characterized by thread height of 1.1 mm+/−about 20%, root to crest clearance within the range of 0.1 mm+/−about 20%, and flank clearance within the range of 0.15 mm+/−about 20%. The male and female thread may have a pitch in the range of 2.5 mm+/−about 20%. The core diameter and the outer diameter of the male thread of the gun body may have a tolerance in the range of −0.05 mm+/−about 20%, respectively. The core diameter and the outer diameter of the female thread of the air nozzle ring may have a tolerance in the range of 0.1 mm+/−about 20%, respectively. The pitch may have a tolerance in the range of 0.1 mm+/−about 20%.

ADVANTAGES

The thread of present invention can have a number of advantages over the fine thread commonly used to connect the body of a spray gun to the nozzle ring. In particular, the modified thread of the present invention is more resistant to dirt, requires fewer revolutions to screw the nozzle on or to unscrew it and suffers from cross-threading less frequently. The thread of the present invention also has a number of advantages over a standard trapezoid thread. The modified thread does not require thickening of the threaded walls of the air nozzle ring or of the body of the gun, which, if required, would add to the overall weight of the gun. Also, the thread of the present invention causes the air nozzle ring to be perfectly centered when screwed onto the gun body. In addition it less sensitive to dirt and requires fewer revolutions to screw on the air nozzle ring or unscrew it.

An example of a modified thread of the present invention that has all the above stated desirable features is described below. However, it should be understood that while it is advantageous that the modified thread has one or more of those desirable features, the present invention does not require the modified thread to have all or any of those features. The present invention shall also be understood to include those advantages and variations a person skilled in the art could deduct from the example given below, from the specification as a whole, and from use of the invention.

DETAILED DESCRIPTION OF A PREFERRED EMBODIMENT OF THE INVENTION

Figure 1:
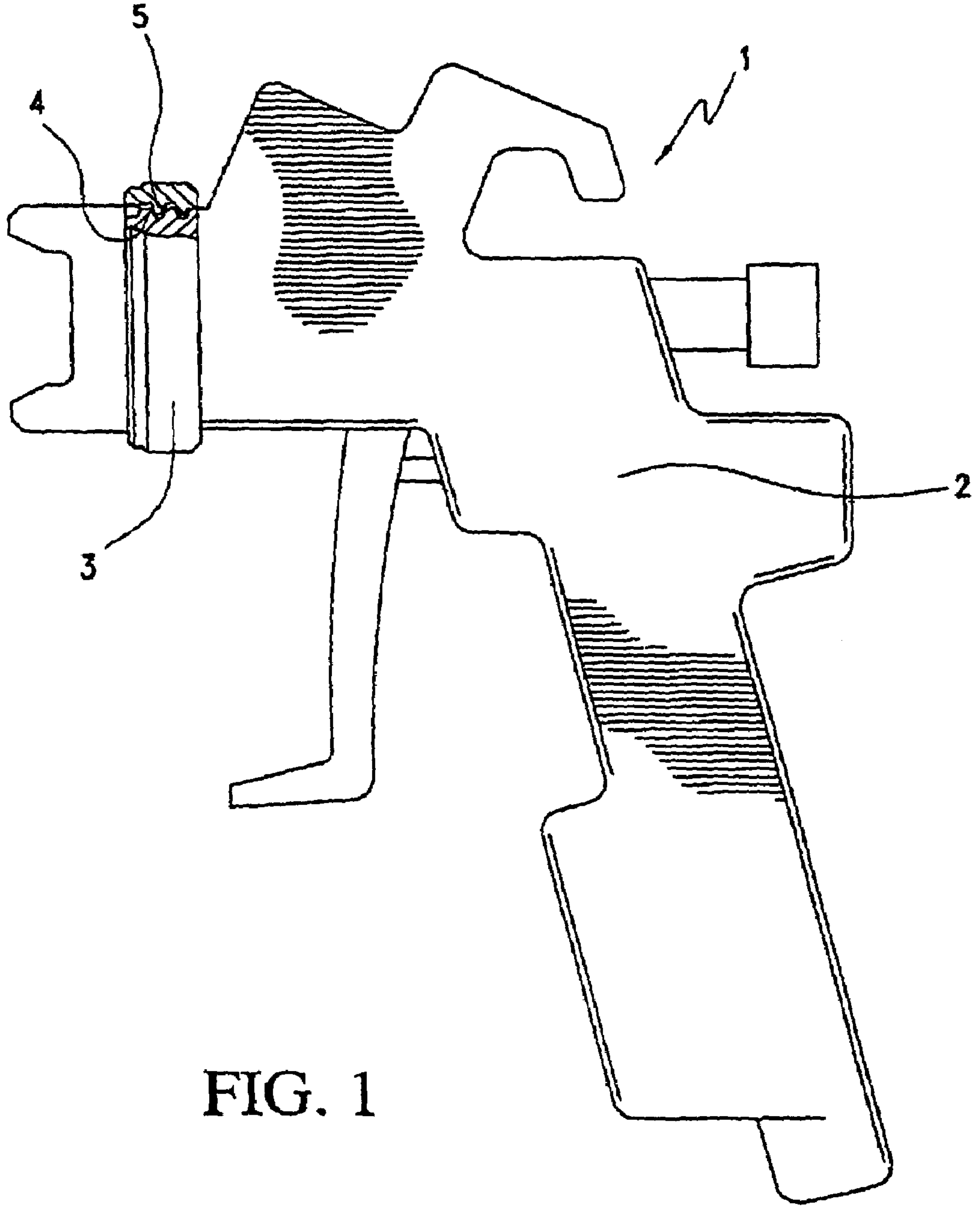
FIG. 1 shows a spray paint gun (1) comprising a gun body (2) having a male thread (4) and an air nozzle ring (3) having a female thread (5).
Figure 2:
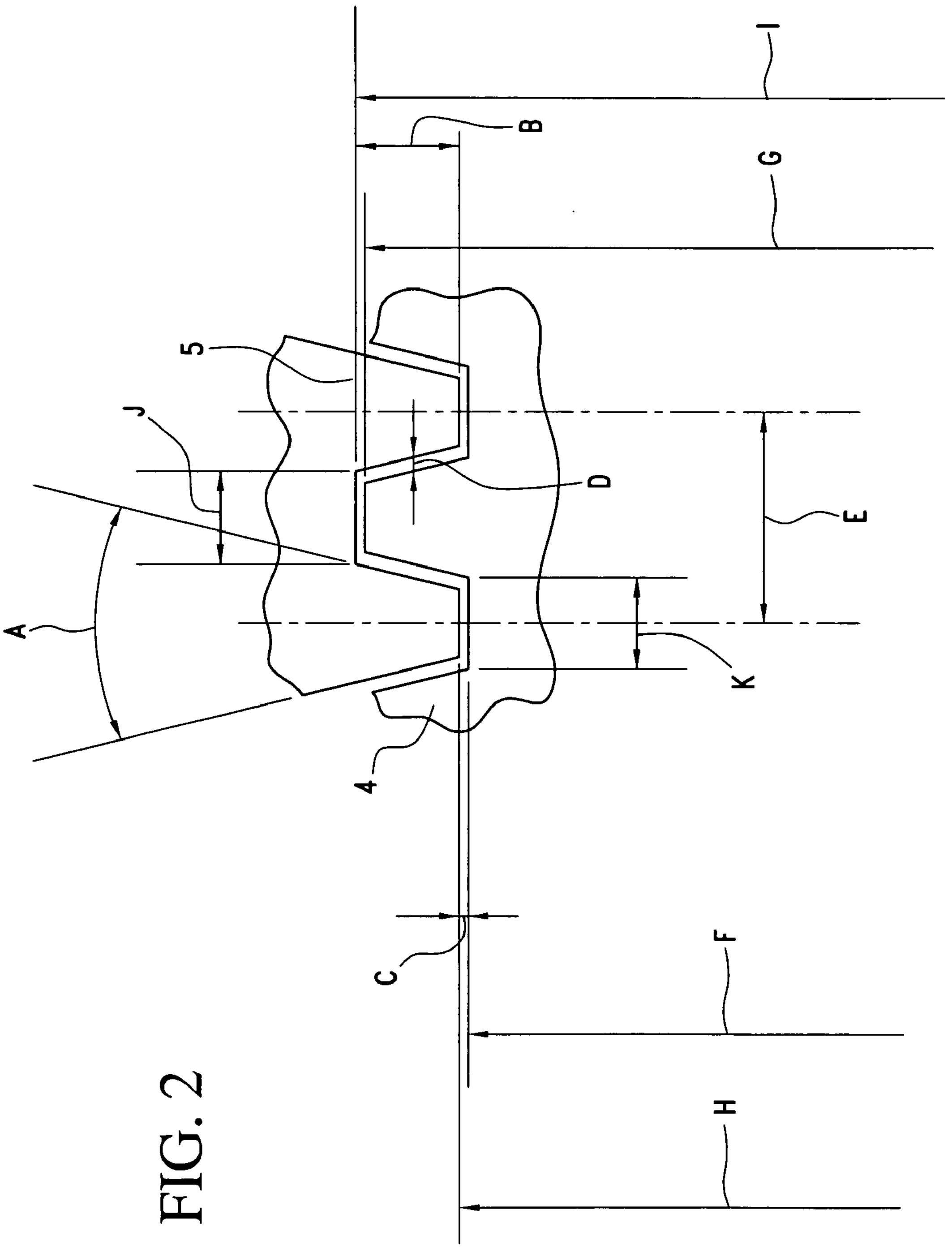
FIG. 2 is a sectional view of the male thread (4) of the gun body (2) and the female thread (5) of the air nozzle ring (3).

To illustrate a preferred embodiment the metric ISO trapezoid DIN 103 thread having the dimensions 38×3 is compared with a modified trapezoid thread according to the invention having a nominal diameter of 38 mm.

In both cases the flank angle (A) is about 30° and the outer diameter of the male thread (G) is about 38 mm. The pitch (E) in the standard thread is 3 mm and in the modified thread about 2.5 mm. The outer diameter of the female thread (I) is in the standard thread 38.5 mm and is in the modified thread about 38.2 mm. The core diameter of the male thread (F) is, in the case of the standard thread, 34.5 mm and in the case of the modified thread, about 35.8 mm. The core diameter of the female thread (H) is in the standard thread 35 mm and in the modified thread about 36 mm.

Thus, in a standard thread the thread height of both the male and female thread is 1.75 mm (overall height 3.5 mm). In the modified thread the thread height (B) of both the male and female thread is about 1.1 mm (overall height about 2.2 mm). The crest to root clearance (C) of the standard thread is 0.25 mm, and of the modified thread about 0.1 mm. The flank clearance (D) of the standard thread is 0.22, and in the modified thread about 0.15.

In the modified thread the core diameter and the outer diameter of the male thread have a tolerance of −0.05 mm, respectively, the core diameter and the outer diameter of the female thread have a tolerance of +0.1 mm, respectively, and the pitch has a tolerance of +/−0.1 mm.

Other examples of preferred embodiments and less preferred embodiments can be deducted from the example given above and the specification as a whole.

I claim:

1. In a spray paint gun comprising a gun body having a male thread, and an air nozzle ring having female thread, the female thread being adapted to be screwed onto the male thread, the improvement comprising:

wherein the male and female threads are trapezoid threads having a flank angle of approximately 30°, wherein the male and female threads have thread diameters between about 30 and about 40 mm, and wherein the male and female thread are characterized by:

thread heights of approximately 1.1 mm, root to crest clearance of approximately 0.1 mm, and flank clearance of approximately 0.15 mm.

2. A spray gun according to claim 1, wherein the male and female threads are further characterized by a pitch of approximately 2.5 mm.

3. A spray gun according to claim 1 or 2, wherein the core diameter and the outer diameter of the male thread of the gun body have a tolerance of approximately −0.05 mm, respectively.

4. A spray gun according to claim 1 or 2, wherein the core diameter and the outer diameter of the male thread of the gun body have a tolerance of approximately −0.05 mm, respectively.

5. A spray gun according to claim 1 or 2, wherein the core diameter and the outer diameter of the female thread of the air nozzle ring have a tolerance of approximately +0.1 mm, respectively.

6. A spray gun according to claim 1 or 2, wherein the core diameter and the outer diameter of the female thread of the air nozzle ring have a tolerance of approximately +0.1 mm, respectively.

7. A spray gun according to claim 3, wherein the core diameter and the outer diameter of the female thread of the air nozzle ring have a tolerance of approximately +0.1 mm, respectively.

8. A spray gun according to claim 4, wherein the core diameter and the outer diameter of the female thread of the air nozzle ring have a tolerance of approximately +0.1 mm, respectively.

9. A spray gun according to claim 2, wherein the pitch has a tolerance of approximately 0.01 mm.

10. A spray gun according to claim 1, wherein the male thread has a nominal diameter of about 38 mm.

11. A spray gun according to claim 2, wherein the male thread has a nominal diameter of about 38 mm.

* * * * *